April 24, 1934.   J. G. DEGERTH   1,956,497

DRIVE FOR SPEED INDICATORS

Filed March 18, 1933

Inventor
John G. Degerth
By
Munn, Anderson, Stanley, Foster & Liddy
Attorneys.

Patented Apr. 24, 1934

1,956,497

UNITED STATES PATENT OFFICE 1,956,497

DRIVE FOR SPEED INDICATORS

John Gustaf Degerth, Helsingfors, Finland, assignor to "Maskin-Och Brobyggnads Aktiebolaget", Helsingfors, Finland Application March 18, 1933, Serial No. 661,640
In Germany March 22, 1932

4 Claims. (Cl. 308—143)

In connection with revolving spindles, particularly when it concerns quickly revolving movable spindles of separators or the like, the spindle is often equipped with a screw or worm which catches into a screw or worm in the spindle of the speed indicator. In such a case the spindle, the speed of which is to be measured, is placed in the frame of the machine independent of the spindle of the speed indicator. From experience it is, however, known that the vibrations of these spindles are very often so considerable that the two gearing parts which should catch into each other (worm and worm wheel respectively, the two screw-wheels) do not come into contact or at least may get apart so far that this will cause more or less serious trouble. By the present invention this disadvantage is to be dispensed with. For this purpose in accordance with the invention the speed indicator itself has been placed into the stationary frame of the spindle bearing, while the part for driving the speed indicator has been placed on the movable bearing of the spindle and is connected with the shaft of the speed indicator by one f. i. by itself known friction coupling.

The drawing shows by way of example a means of putting the invention into effect:—

Figure 1:
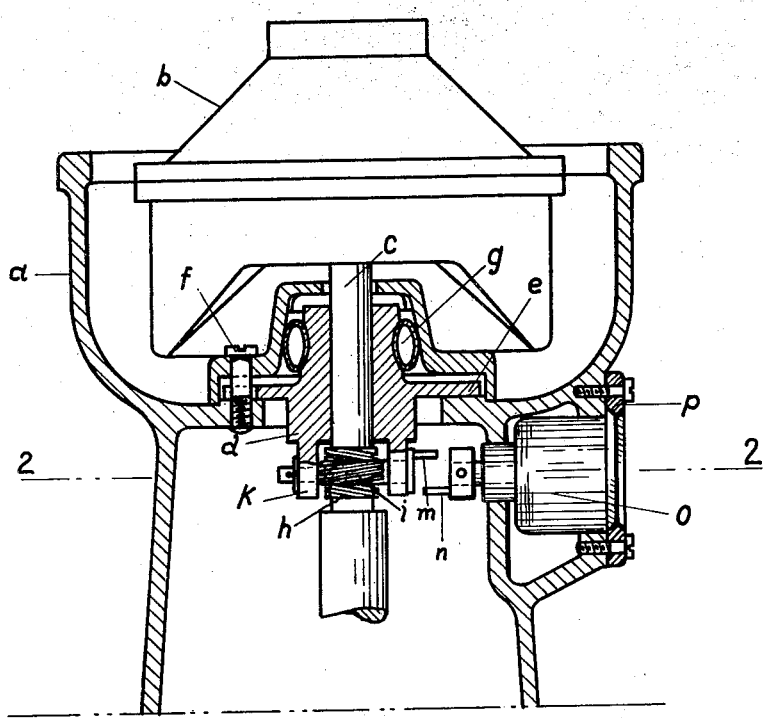
Fig. 1 shows a section of the parts of a cream separator.
Figure 2:
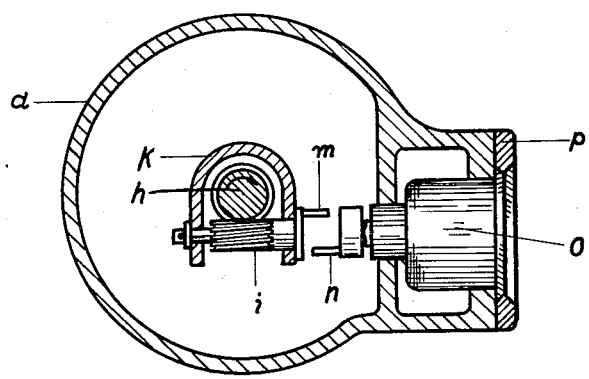
Fig. 2 shows a section through Fig. 1 in the direction 2—2.

In the drawing $a$ indicates the frame of the machine, $b$ the rotating part which is placed on a spindle $c$. The spindle $c$ is arranged in a bearing $d$ and the latter is movably placed in the frame i. e. it rests by means of a flange $e$ on a portion of the frame and has some openings for the screws $f$ screwed into the frame. By means of a spring $g$ inserted between the neck-bearing and the frame the lateral vibrations of the bearing and thus of the shaft $c$ are rendered possible. At a suitable place the shaft $c$ is equipped with a worm or a screw $h$ which catches into a worm or a corresponding screw wheel $i$.

In accordance with the invention the lower part of the bearing $d$ has a preferably horse-shoe formed extension $k$, the two legs of which are used as bearing for the spindle of the worm wheel or screw wheel $i$. On the shaft of the worm wheel $i$ at the outside of the bearing in the part $k$ a friction or coupling part $m$ is arranged which catches into a corresponding coupling part $n$ on the shaft of the speed indicator $o$, in order to move same. The speed indicator itself has a transparent disc and is kept in position by a ring $p$ fastened to the frame.

On account of the worm or screw wheel $i$ being kept in the same bearing as the spindle $c$ respectively the worm $h$ these parts remain constantly in the same position to each other i. e. the worm wheel $i$ follows the vibrations of the shaft $c$ so that the contact between these two parts and an absolutely safe gripping of the tachometer shaft will be secured. Of course, the invention is also applicable, if the transmission of the revolution of the shaft $c$ on the tachometer shaft is effected by other means f. i. a friction wheel gearing or such like; the bearing $k$ for the worm or screw $i$ can also be a special part rigidly connected with the bearing $d$.

I claim:

1. Drive for speed indicator for quickly revolving, movably arranged spindles, at which a gearing part fitted to the spindle catches into a gearing part on the driving shaft of the speed indicator, characterized thereby that the speed indicator itself ($o$) is placed into the stationary frame ($a$) of the spindle bearing, while the gearing part ($i$) for driving the speed indicator is arranged on the movable bearing ($d$) of the spindle and is connected with the shaft of the speed indicator by a coupling f. i. an already known friction coupling ($m$, $n$).

2. The combination of a spindle, a resiliently mounted bearing in which the spindle is journaled, a tachometer operatively mounted with respect to said bearing for indicating the speed of the spindle, a driving member on said spindle, driving means between the driving member and said tachometer, and bearing means fixed on said first bearing operatively supporting said driving means.

3. The combination of a spindle, a resiliently mounted bearing in which the spindle is journaled, a driving gear on said spindle, a driven shaft having a gear meshing with said first gear, and bearing means fixed on said first bearing rotatably mounting said shaft.

4. The combination of a frame structure, a bearing resiliently mounted on said structure, a spindle journaled in said bearing, a tachometer for indicating the speed of said spindle, said tachometer being fixed on said structure, a gear on said spindle, driving means operatively interposing said gear and tachometer, said driving means consisting of a shaft and a gear on said shaft which meshes with said first gear, and bearing means fixed on said first bearing rotatably mounting said shaft.

JOHN GUSTAF DEGERTH.